US007599764B2

(12) United States Patent
Matsuura et al.

(10) Patent No.: US 7,599,764 B2
(45) Date of Patent: Oct. 6, 2009

(54) VEHICLE REMOTE STARTING APPARATUS AND METHOD FOR EXECUTING REGISTRATION PROCESS

(75) Inventors: Akira Matsuura, Hyogo (JP); Masaki Koike, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 916 days.

(21) Appl. No.: 11/111,913

(22) Filed: Apr. 22, 2005

(65) Prior Publication Data

US 2005/0246070 A1 Nov. 3, 2005

(30) Foreign Application Priority Data

Apr. 22, 2004 (JP) .......................... P2004-127093

(51) Int. Cl.
*B60R 27/00* (2006.01)
*G06F 19/00* (2006.01)

(52) U.S. Cl. ............. 701/2; 701/1; 701/33; 340/426.13

(58) Field of Classification Search ..................... 701/1, 701/2, 33; 340/426.25, 426.13; 307/10.1
See application file for complete search history.

(56) References Cited

U.S. PATENT DOCUMENTS

| | | | | |
|---|---|---|---|---|
| 5,663,704 | A * | 9/1997 | Allen et al. | 340/426.25 |
| 5,719,551 | A * | 2/1998 | Flick | 340/426.25 |
| 5,739,674 | A * | 4/1998 | Kawahara et al. | 320/106 |
| 6,591,803 | B2 * | 7/2003 | Chang | 123/179.2 |
| 6,873,824 | B2 * | 3/2005 | Flick | 455/41.2 |
| 7,091,824 | B2 * | 8/2006 | Matsubara et al. | 340/5.72 |
| 7,151,325 | B2 * | 12/2006 | Matsubara et al. | 307/10.6 |
| 2004/0168663 | A1 | 9/2004 | Matsuura et al. | |
| 2004/0262068 | A1 | 12/2004 | Matsubara et al. | |
| 2005/0001483 | A1 | 1/2005 | Matsubara et al. | |
| 2005/0073197 | A1 | 4/2005 | Matsubara et al. | |

FOREIGN PATENT DOCUMENTS

| | | |
|---|---|---|
| JP | A 6-137240 | 5/1994 |
| JP | A 6-336966 | 12/1994 |
| JP | A 8-150902 | 6/1996 |
| JP | A-9-317612 | 9/1997 |
| JP | A 10-26067 | 1/1998 |
| JP | A 10-81201 | 3/1998 |
| JP | A 10-176642 | 6/1998 |
| JP | A 2001-270424 | 10/2001 |

* cited by examiner

*Primary Examiner*—Tan Q Nguyen
(74) *Attorney, Agent, or Firm*—Oliff & Berridge, PLC

(57) ABSTRACT

A vehicle remote starting apparatus includes a control device that starts an engine when the control device has set a registration flag and the control device receives an engine starting signal from an external device, which is apart from the vehicle remote starting apparatus. When the vehicle remote starting apparatus is mounted on a vehicle, the control device executes registration process for setting the registration flag, which allows the control device to start the engine when the control device receives the engine starting signal.

16 Claims, 8 Drawing Sheets

IGSW 3

DOOR COURTESY SW4

LOCK SW5

HOOD SW6

BRAKE SW7

KEY SENSOR 8

SHIFT POSITION SENSOR 9

CHECK E/G SIGNAL 10

VEHICLE SPEED
PRESENCE SIGNAL 11

E/G REVOLUSION SIGNAL 12

VEHICLE REMOTE STARTING APPARATUS AND METHOD FOR EXECUTING REGISTRATION PROCESS

BACKGROUND OF THE INVENTION

1. Field of the Invention

The present invention relates to a vehicle remote starting apparatus used for starting an engine of a vehicle placed in a place remote from a user, such as a parking area, and a method for executing a registration process.

2. Description of the Related Art

In a vehicle such as an automobile, a starter motor is actuated with using a battery attached to a vehicle body as a power source and by its rotation force, cranking of an engine is performed to start the engine. A driver inserts an ignition key into a key hole of an ignition switch and rotates this key by a predetermined angle to turn on the ignition switch, thereby actuating this starter motor. However, recently, many devices for starting an engine by remote control in a state where a driver does not ride in a vehicle have been used. This is because an air conditioner or a heater is started up in summer or winter before starting moving the vehicle.

A vehicle remote starting system includes a transmitter carried by a driver, a receiver attached to the vehicle and a controller. In the case that the receiver receives a starting signal from the transmitter and engine starting is controlled by the controller, only when conditions including safety condition are satisfied, the controller outputs a starting command signal and based on this starting command signal, an ignition switch constructing the starting apparatus is closed and a self starter motor is driven and the engine is started.

The safety condition for outputting the starting command signal includes a condition that a door is closed and locked for theft prevention, a condition that a parking brake is activated to ensure safety so that a vehicle does not move accidentally, a condition that a gear shift is in a parking position, and further a condition that a hood is closed to prevent an accident during work in which the hood is opened.

In order to check such conditions, the vehicle is provided with various switches and sensors. In some switches, control logic of an output signal changes to a high (H) level in a state where a switch is opened, that is, the switch is in a normal state. Also, the control logic changes to a low (L) level in a state where the switch is closed, that is, the switch is in an operated state. For example, a hood switch installed inside an engine room has a configuration shown in FIG. 5. When a hood is opened, a contact point 31 of a hood switch (SW) 30 closes and when the hood is closed, the contact point 31 opens. As a result, when the hood is opened, a signal of an L level is input to a remote starting control device 40. When the hood is closed, a signal of an H level is input to the remote starting control device 40. The remote starting control device 40 is configured to detect as to whether or not the hood is in the opened state with using an input from this hood switch 30. The remote starting control device 40 does not output the starting command signal unless the hood is closed.

When the circuit configuration as described above is adopted, as shown in FIG. 6, for example, in the case that wiring of the hood switch 30 is broken or the case of missing connecting the hood switch 30, an input from the hood switch 30 shifts to an H level although the hood is opened as shown in FIG. 6. Therefore, the remote starting control device 40 decides that the hood is closed, and the engine is started. This causes a problem in safety.

As a result, when a structure in which a contact point is closed when the hood is closed is adopted as the hood switch, such a problem does not arise. However, problems that attachment accuracy of the hood switch is required or a structure of the hood switch becomes complicated and cost increases arise.

JP-A-Hei. 6-137240 has disclosed a vehicle remote starting apparatus in which a resistor is connected in parallel to the contact point of the hood switch in order to recognize the open/close state of the hood reliably. Three types of signals showing a state in which the hood is closed, a state in which the hood is opened, and a state in which existence of the hood switch cannot be recognized are transmitted to the remote starting control apparatus. The state in which the existence of the hood cannot be recognized includes a case that a wiring connected to the hood switch is broken and a case that a user forgets to connect the hood switch. With this configuration, the state of the hood can be confirmed reliably.

SUMMARY OF THE INVENTION

For example, in the hood switch, control logic of an input signal to the remote starting control apparatus changes to an H level in a state where the switch is opened in a normal state (hood is closed) and the control logic changes to an L level in a state where the switch is closed in an operation state (hood is opened). In the case of the switch with such control logic, there arises a problem that the operation state is recognized as the normal state even when wiring of the switch part is broken or the switch is not connected as described above.

The wrong recognition as described above can also be prevented by devising a switch circuit of the hood switch etc. as described above. However, this devising causes another problem that it becomes necessary to add a special circuit to the switch circuit and cost increases. Also, when a remote starting apparatus is newly attached to a vehicle, replacement of the hood switch etc. is required. As a result, much effort is taken in attachment.

In view of the aforementioned circumstances, the invention provides a vehicle remote starting apparatus capable of checking that a sensor or a switch such as a hood switch is not abnormal at a time of installation of the apparatus; detecting abnormality of the switch after installation of the apparatus; and outputting an engine starting signal only when an engine remote starting condition is satisfied.

According to one embodiment of the invention, a vehicle remote starting apparatus includes a control device that starts an engine when the control device has set a registration flag and the control device receives an engine starting signal from an external device, which is apart from the vehicle remote starting apparatus. When the vehicle remote starting apparatus is mounted on a vehicle, the control device executes registration process for setting the registration flag, which allows the control device to start the engine when the control device receives the engine starting signal.

According to this configuration, the registration process is required at the time of mounting the remote starting apparatus on the vehicle. If the registration process is not done, the vehicle remote starting apparatus is not allowed to activate the remote engine starting function. Therefore, the safety can be ensured.

According to one embodiment of the invention, the control device may receive a signal input from the vehicle. When the control device receives the engine starting signal and confirms that the signal input from the vehicle satisfies an engine starting condition, the control device may start the engine. During the registration process, the control device may check changing of the signal input from the vehicle. When the control device determines that the signal input from the vehicle does not change during the registration process, the control device may not set the registration flag.

Furthermore, The signal input from the vehicle may change in response to a state of a switch, which is turned off when the switch is in a normal state and is turned on when the switch is operated.

The signal input from the vehicle may be a signal output from a group consisting of a door switch, a hood switch, a key sensor, an ignition switch, a brake switch, a shift position, and a gear shift position sensor.

According to this configuration, the control device confirms as to whether or not switches and sensors are normal, by checking changes of the signals input from a switch, which is turned off when the switch is in a normal state and is turned on when the switch is operated, such as a door switch, a hood switch, a key sensor, an ignition switch, a brake switch and a gear shift position sensor. If there is something wrong with any of the switches and sensors, the registration flag is not set and a function of the remote starting apparatus is inhibited.

According to one embodiment of the invention, the vehicle remote starting apparatus may further include a display device. When the control device has not set the registration flag, the control device displays on the display device a message indicating that the control device is in an inhibition state.

According to this configuration, when the control unit has not set the registration flag, the message indicating it is displayed. Therefore, a user can easily recognize that the remote starting function is inhibited and registration process is required.

According to one embodiment of the invention, when the vehicle remote starting apparatus is powered down, the control device may release the registration flag.

Also, when the vehicle remote starting apparatus is powered down in a state where a hood of the vehicle is opened, the control device may not release the registration flag.

According to this configuration, when a power source of the remote starting apparatus is turned off by an operation other than normal maintenance operation, the registration flag is released, the remote starting function is inhibited. On the other hand, the control device regards a power cut in a state where the hood is opened as a normal maintenance operation, and the remote starting function of the remote starting apparatus connected is held and is validated. Therefore, the need for registration process after the normal maintenance operation can be eliminated.

According to one embodiment of the invention, when the vehicle remote starting apparatus is powered on, the control device may release the registration flag except for in a state where a hood of the vehicle is opened.

According to this configuration, in the case that a battery is once detached by an improper access to the battery or the case that a power source is not supplied to the remote starting apparatus, the registration flag is released if a hood is not opened when the battery is again connected and the power source is supplied to the remote starting apparatus. Therefore, the remote starting function can be inhibited at the time of unauthorized attachment.

According to one embodiment of the invention, when the engine is started with using a key, the control device may check the signal input from the vehicle and then if the signal input from the vehicle does not satisfy a predetermined condition, the control device may release the registration flag.

According to this configuration, an on/off state of an input signal required to perform the remote starting is checked at the time of starting the engine with using a key. When the signal input from the vehicle does not satisfy the predetermined condition, the remote starting function is inhibited. Therefore, abnormality of a switch or a sensor after the remote starting apparatus is mounted on the vehicle can be detected.

According to one embodiment of the invention, the signal input from the vehicle may include a specific signal, which should be in a predetermined state during traveling of the vehicle. During the traveling of the vehicle, the control device may check the specific signal and then if the specific signal is not in the predetermined state, the control device releases the registration flag.

According to this configuration, an on/off state of a predetermined input signal (specific signal) is checked during the traveling of the vehicle. When the predetermined input signal (specific signal) is not in the predetermined state, the registration flag is released and the remote starting function is inhibited. Therefore, abnormality of switches and sensors after the remote starting apparatus is mounted on the vehicle can be detected in a manner similar to the above.

DETAILED DESCRIPTION OF THE PREFERRED EMBODIMENTS

A vehicle remote starting apparatus of embodiments of the invention will be described below with reference to the drawings.

Figure 1:
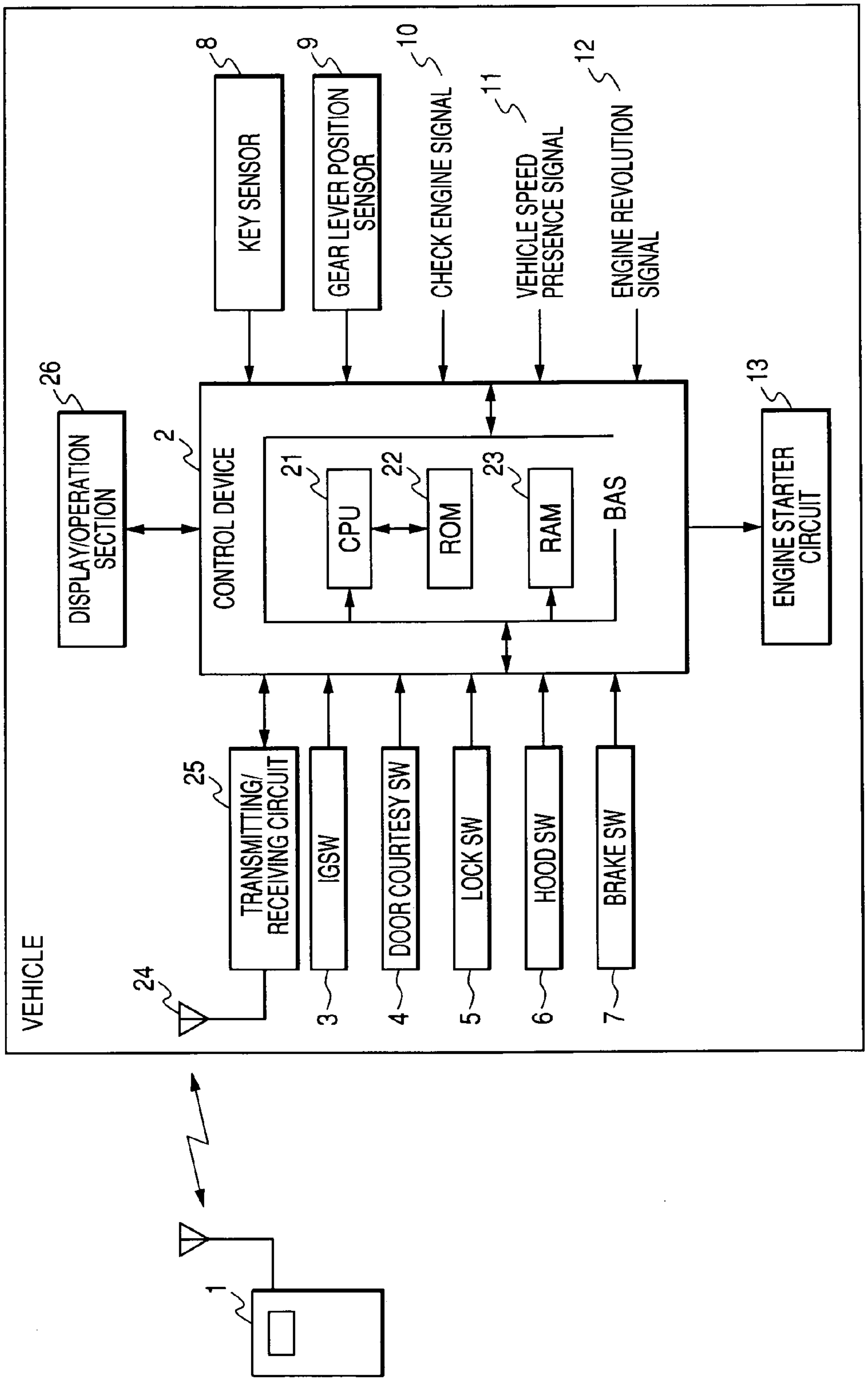
FIG. 1 is a diagram showing a configuration of a vehicle remote starting apparatus according to one embodiment of the invention.

FIG. 1 is a diagram showing a configuration of a vehicle remote starting apparatus according to one embodiment of the invention. The vehicle remote starting apparatus includes a remote controller 1 and a control device 2 for starting the vehicle in response to a starting signal transmitted from the remote controller 1.

The remote controller 1 is portable outside the vehicle, and has an operation button, a microcomputer, memory, a transmitter, an antenna and so on (not shown). This remote controller 1 is not limited to what is called a general remote controller, but may be what can perform the remote control such as a mobile phone.

On the other hand, the control device 2 has a CPU 21, ROM (Read Only Memory) 22 and RAM (Random Access Memory) 23. The CPU 21 controls each part of hardware of the control device 2 and also executes various programs of an operation check or engine starting, etc. based on programs stored in the ROM 22. Also, the RAM 23 is constructed of SRAM or the like, and stores temporary data generated during execution of the programs and also stores an operation indication message or a registration flag.

A transmitting/receiving circuit 25 having an antenna 24, an IGSW 3 for detecting a switching state of an ignition switch, a door courtesy switch (SW) 4 for detecting opened/closed states of a door, a lock switch 5, a hood switch 6, a brake switch 7, a key sensor 8 and a gear shift position sensor 9 are connected to the control device 2. Also, a check engine signal 10 output from a vehicle electronic control device (ECU) (not shown), a vehicle speed presence signal 11 and an engine revolution signal 12 are input to the control device 2.

Also, an engine starter circuit 13 and a display/operation section 26 are connected to the control device 2. The display/operation section 26 includes an LCD display part. A touch panel switch is disposed in the LCD display part of the display/operation section 26. By depressing an item portion displayed on the LCD display part, a user can select a function corresponding to the depressed item. The antenna 24 has proper shape such as rod shape and is installed on an upper portion of an instrument panel of an automobile when used.

On the other hand, the IGSW 3 detects an on/off state of ignition, and outputs an H level at the time of the on state of the ignition and outputs an L level at the time of the off state of the ignition. The door courtesy switch 4 includes four door switches for a driver seat, a passenger seat and rear seats. Each door switch is disposed in the automobile so that a room lamp illuminates automatically when the corresponding door is opened at night. When a door is opened, a pin pushed into a part of the door until then protrudes and the corresponding door switch changes to the on state (L level). When a door is closed, the pin is pushed into and the corresponding door switch changes to the off state (H level). When all the doors are closed, the door courtesy switch 4 outputs a signal of the H level.

Also, the lock switch 5 detects a lock state of a door and when the door is locked, an H level is output and when the door is unlocked, an L level is output. The hood switch 6 outputs an H level when a bonnet with which an engine room is covered is closed, and outputs an L level when the bonnet is opened. Further, the brake switch 7 outputs an H level when a parking brake is applied, and outputs an L level in a state of brake release.

Also, the key sensor 8 detects that an engine key is inserted into key hole of a key cylinder. When the key is present (inserted), the key sensor 8 outputs an L level signal. When the key is not inserted, the key sensor 8 outputs an H level signal. The gear shift position sensor 9 outputs an H level when a gear shift of an automatic transmission of an automatic automobile is shifted in a parking position, and outputs an L level when the gear shift is in positions other than the parking position.

On the other hand, the check engine signal 10 is on/off signals of a lamp indicating abnormality of an engine. When the lamp is turned on, an L level is input to the control device 2. When the lamp is turned off, an H level is input to the control device 2. Also, the vehicle speed presence signal 11 changes to an H level when the vehicle travels (that is, the vehicle does not stop). The engine revolution signal 12 changes to an H level when an engine is revolving.

In the case that the control device 2 receives an engine starting signal from the remote controller 1 through the antenna 24 and the transmitting/receiving circuit 25, the control device 2 determines inputs from the door courtesy switch 4 and the hood switch 6. When either a door or a hood is in an opened state, the control device 2 does not drive the engine starter circuit 13 and the engine of the vehicle is not started. Also, in the case of detecting an on state of any of the brake switch 7 and the check engine signal 10, the control device 2 does not drive the engine starter circuit 13 and the engine of the vehicle is not started in a similar manner to the case where either the door or the hood is in the opened state. Then, except for the above cases, the control device 2 outputs a starting command signal to the engine starter circuit 13 to start the engine.

The remote starting apparatus according to this embodiment requires registration process for activating a remote starting function when the remote starting apparatus is first attached to the vehicle. Procedures of this registration process will be described below with reference to flowcharts shown in FIGS. 2A and 2B.

Figure 2A:
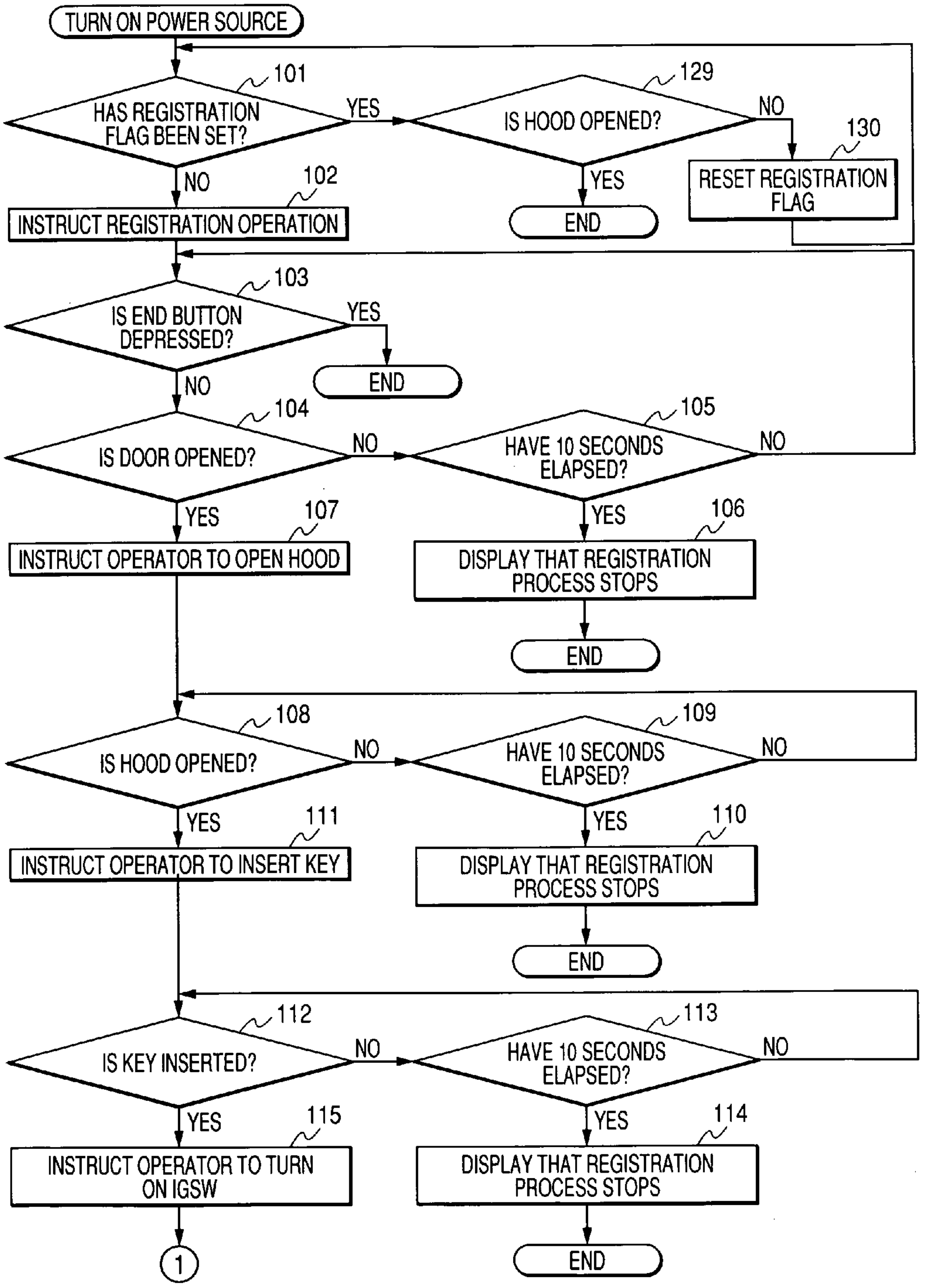
FIG. 2A is a flowchart showing action at the time of registration process of the vehicle remote starting apparatus.
Figure 2B:
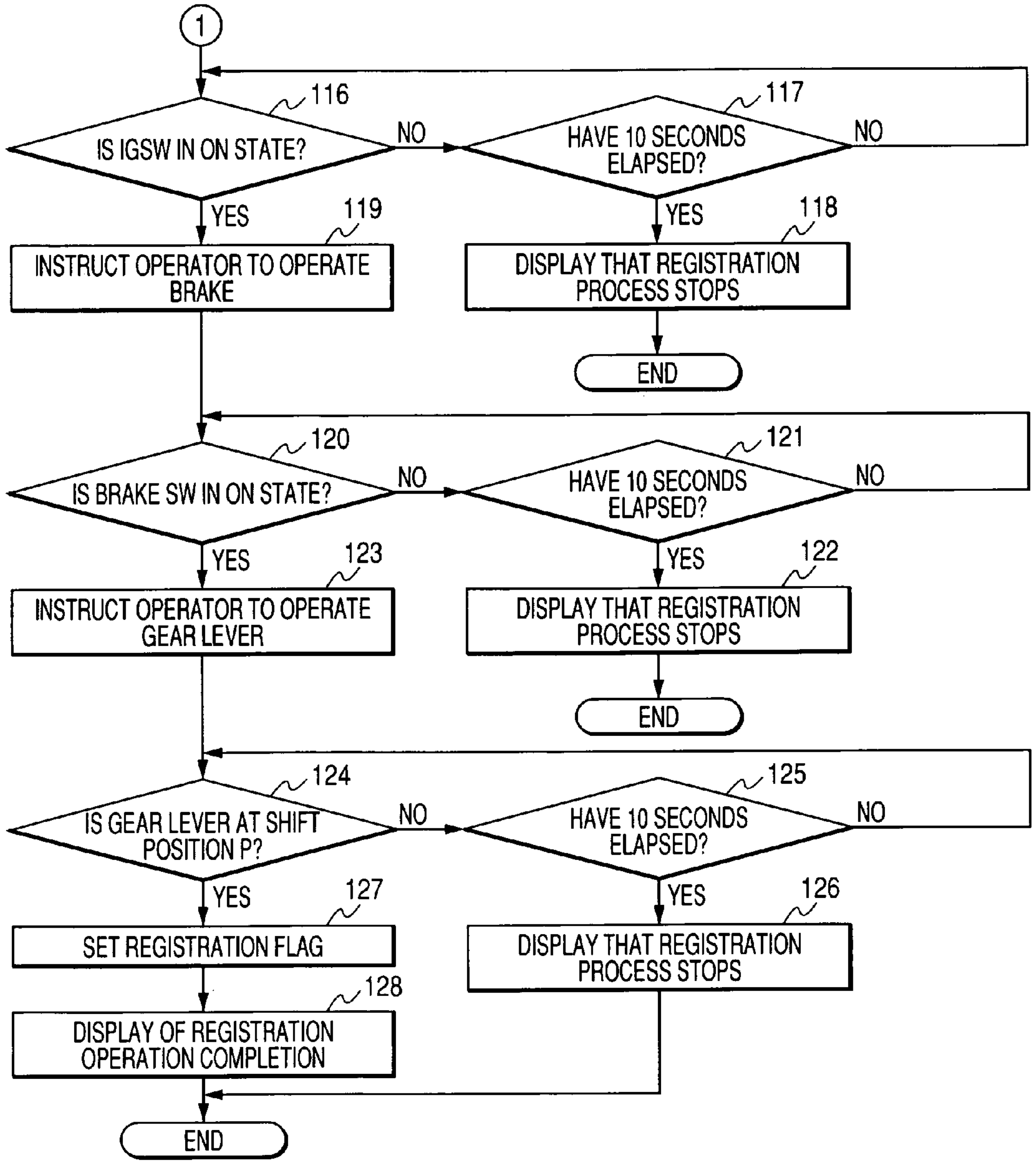
FIG. 2B is a flowchart showing action at the time of registration process of the vehicle remote starting apparatus.

When a remote starting apparatus is attached to a vehicle and an operator turns on a power source, the CPU 21 of the control device 2 reads a registration process program shown in the flowchart of FIGS. 2A and 2B from the ROM 22, and initiates the registration process. First, the CPU 21 determines as to whether or not the registration flag stored in the RAM 23 has been set (step 101). The registration flag is set in the case of completing the registration process. When the registration flag has not been set, remote starting of the engine by the remote controller 1 is inhibited.

When the registration flag has not been set, the CPU 21 reads from the RAM 23 a message that "Remote starting of the engine cannot be performed because registration process of the remote starting apparatus has not been performed. Open a driver seat door if you perform the registration process. Press an end button if you do not perform the registration process.", and displays the message on the display/operation section 26 (step 102). In response to this message, the operator performs an operation for opening the driver seat door when the registration process is performed. The operator depresses the "end" button displayed on the display/operation section 26 when the registration process is not performed.

Next, the CPU 21 determines as to whether or not the "end" button is depressed (step 103). When the "end" button is pressed, the program is terminated. When the "end" button is not pressed, the CPU 21 determines as to whether or not the driver seat door is opened by judging whether or not the input from the door courtesy switch 4 is at the L level (step 104). When the input from the door courtesy switch 4 is at the H level, the CPU 21 determines as to whether or not 10 seconds have elapsed since the CPU 21 instructed the operator to open the driver seat door (step 105). When 10 seconds have not elapsed, the program returns to step 103.

In the case of concluding that 10 seconds have elapsed since the CPU 21 instructed the operator step 105, the CPU 21 reads from the RAM 23 a message that "Check a switch of the driver seat door because it may be disconnected or wiring may fail. The registration operation is terminated once.", and displays the message on the display/operation section 26 (step 106). Thereafter, the program is terminated. From this message, the operator recognizes that abnormality occurs in the switch of the driver seat door, and can inspect the switch of the driver seat door.

On the other hand, in the case of concluding that the input from the door courtesy switch 4 is at the L level in step 104, the CPU 21 then instructs the operator to open the passenger seat door, the rear seat doors and detects level of the door courtesy switch. The description thereon will be omitted because it is similar to that of the driver seat door.

When a check of the door courtesy switch is completed, the CPU 21 then reads from the RAM 23 a message that "Open a hood.", and displays the message on the display/operation section 26 (step 107). In response to this message, the operator goes out of the vehicle and opens a hood, and then returns to the inside of the vehicle.

Then, the CPU 21 determines as to whether or not the hood is opened by judging as to whether or not an input from the hood switch 6 is at an L level (step 108). When the input of the hood switch 6 is at an H level, the CPU 21 determines as to whether or not 10 seconds have elapsed since the CPU 21 indicated the operator to open the hood (step 109), and when 10 seconds have not elapsed, the program returns to step 108.

In the case of judging that 10 seconds have elapsed since the CPU 21 indicated the operator to open the hood in step 109, the CPU 21 reads from the RAM 23 a message that "Check a hood switch because it may be disconnected or wiring may fail. The registration operation is terminated once.", and displays the message on the display/operation section 26 (step 110). Thereafter, the program is terminated. From this message, the operator recognizes that there is something wrong with the hood switch, and can inspect a hood switch part.

On the other hand, in the case of concluding that the input from the hood switch 6 is at the L level in step 108, the CPU 21 concludes that the hood switch is normal. Then, the CPU 21 reads from the RAM 23 a message that "Insert a key.", and displays the message on the display/operation section 26 (step 111). In response to this message, the operator inserts an engine key into key hole of a key cylinder.

Subsequently, the CPU 21 determines as to whether or not the key is inserted by judging as to whether or not an input from the key sensor 8 is at an L level (step 112). When the input from the key sensor 8 is at an H level, the CPU 21 determines as to whether or not 10 seconds have elapsed since the CPU 21 instructs the operator to insert the key (step 113). When 10 seconds have not elapsed, the program returns to step 112.

In the case of concluding that 10 seconds have elapsed since the CPU 21 instructed the operator in step 113, the CPU 21 reads from the RAM 23 a message that "Check a key sensor because it may be not connected to a main unit. If there is no problem in the connection, contact the outlet store because the key sensor may fail. The registration process is terminated once.", and displays the message on the display/operation section 26 (step 114). Thereafter, the program is terminated. From this message, the operator recognizes that there is something wrong with the key sensor, and can inspect the key sensor.

Also, in the case of concluding that the input from the key sensor is at the L level in step 112, the CPU 21 concludes that the key sensor is normal. Then, the CPU 21 reads from the RAM 23 a message that "Turn on an ignition switch.", and displays the message on the display/operation section 26 (step 115). In response to this message, the operator turns on an ignition switch by rotating an ignition key by a predetermined angle.

Subsequently, the CPU 21 determines as to whether or not the IGSW 3 is turned on by determining as to whether or not an input from the IGSW 3 is at an H level (step 116). When the input from the IGSW 3 changes to an L level, the CPU 21 determines as to whether or not 10 seconds have elapsed since the CPU 21 instructed the operator to turn on the IGSW 3 (step 117). When 10 seconds have not elapsed, the program returns to step 116.

In the case of concluding that 10 seconds have elapsed since the CPU 21 instructed the operator to operate the IGSW in step 117, the CPU 21 reads from the RAM 23 a message that "Check an ignition switch because it may be disconnected or the wiring may fail. The registration operation is terminated once.", and displays the message on the display/operation section 26 (step 118). Thereafter, the program is terminated. From this message, the operator recognizes that there is something wrong with the IGSW 3, and can inspect an ignition switch part.

Then, in the case of concluding that the input from the IGSW 3 changes to the H level in step 116, the CPU 21 concludes that the IGSW 3 is normal. Then, the CPU 21 reads from the RAM 23 a message that "Actuate a parking brake.", and displays the message on the display/operation section 26 (step 119). In response to this message, the operator applies and actuates the parking brake.

Subsequently, the CPU 21 determines as to whether or not the parking brake is actuated by determining as to whether or not the brake switch 7 is at an H level (step 120). When an input from the parking brake switch 7 is at an L level, the CPU 21 determines as to whether or not 10 seconds have elapsed since the CPU 21 instructed the operator to operate the parking brake (step 121). When 10 seconds have not elapsed, the program returns to step 120.

In the case of concluding that 10 seconds have elapsed since the CPU 21 instructed the operator to operate the parking brake in step 121, the CPU 21 reads from the RAM 23 a message that "Check a brake switch because it may be disconnected or the wiring may fail. The registration operation is terminated once.", and displays the message on the display/operation section 26 (step 122). Thereafter, the program is terminated. From this message, the operator recognizes that there is something wrong with the brake switch, and can inspect a brake switch part.

Also, in the case of concluding that the input from the brake switch 7 is at the H level in step 120, the CPU 21 concludes that the brake switch is normal. Then, the CPU 21 reads from the RAM 23 a message that "Move a gear shift of an automatic transmission in a parking position.", and displays the message on the display/operation section 26 (step 123). In response to this message, the operator moves the gear shift of the automatic transmission in the parking position.

Subsequently, the CPU 21 determines as to whether or not the gear shift is in the shift position P by determining as to whether or not an input from the gear shift position sensor 9 is at an H level (step 124). When the input from the gear shift position sensor 9 is at an L level, the CPU 21 determines as to whether or not 10 seconds have elapsed since the CPU 21 instructed the operator to operate the gear shift (step 125). When 10 seconds have not elapsed, the program returns to step 124.

In the case of concluding that 10 seconds have elapsed since the CPU 21 instructed the operator to operate the gear shift in step 125, the CPU 21 reads from the RAM 23 a message that "Check a gear shift position sensor because it may be not connected to a main unit. When there is no problem of the connection, contact the outlet store because the gear shift position sensor may fail. The registration process is terminated once.", and displays the message on the display/operation section 26 (step 126). Thereafter, the program is terminated. From this message, the operator recognizes that there is something wrong with the gear shift position sensor, and can inspect a gear shift position sensor part.

Also, in the case of concluding that the input from the gear shift position sensor 9 is at the H level in step 124, the CPU 21 concludes that the gear shift position sensor is normal. Then, the CPU 21 sets a registration flag stored in the RAM 23 (step 127). Subsequently, the CPU 21 reads from the RAM 23 a message that "The registration process of the vehicle remote starting apparatus is completed. Remote starting by the remote controller can be performed.", and displays the message on the display/operation section 26 (step 128). Thereafter, the program is terminated.

On the other hand, in the case of concluding that the registration flag has already been set in step 101, the CPU 21 determines as to whether or not the hood is opened by determining as to whether or not an input from the hood switch 6 is at the L level (step 129). When the hood is not opened, the CPU 21 concludes that a power source is turned on again after the remote starting apparatus is detached from the vehicle in an improper manner, and the program returns to step 101 after the registration flag is reset (step 130).

Also, in the case of concluding that the hood is opened in step 129, the CPU 21 concludes that a battery of the vehicle is detached in a proper manner. Then, the CPU 21 terminates the program without resetting the registration flag.

Thus, when the vehicle remote starting apparatus is powered on, connection of switches and sensors and wire connection between the switches and sensors are checked by confirming changing of input signals, which are used as a starting condition of the remote starting apparatus. When the CPU 21 does not detect the changing of the signal, the CPU 21 concludes that there is something wrong with the switches or the sensors and the registration process is not completed. As a result, the remote starting function is inhibited, so that safety can be ensured.

Next, procedure performed during the case of powering down the remote starting apparatus due to a maintenance work or the like will be described with reference to a flowchart of FIG. 3.

Figure 3:
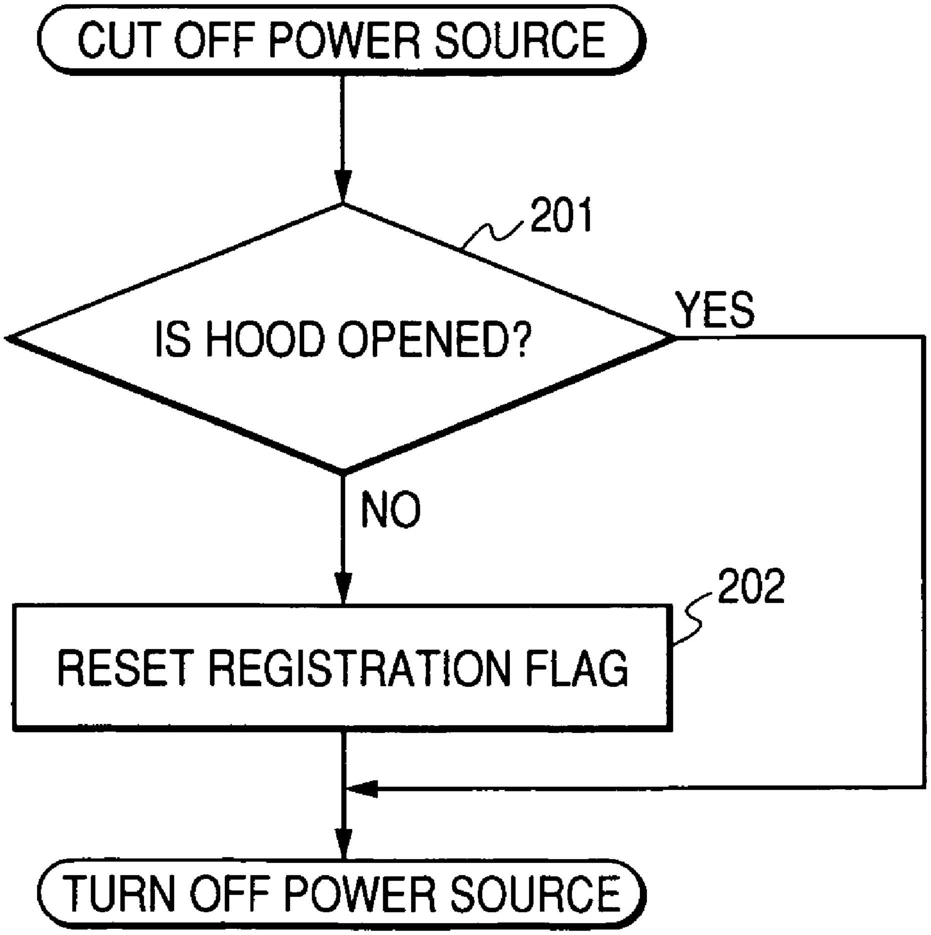
FIG. 3 is a flowchart showing action at the time of powering down the remote starting apparatus.

When an operator instructs powering-down, the CPU 21 of the control device 2 reads from the ROM 22 a powering-down program shown in the flowchart of FIG. 3, and initiates the powering-down processing. First, the CPU 21 determines as to whether or not the hood is opened by determining as to whether or not an input from the hood switch 6 is at the L level (step 201). In the case of concluding that the hood is opened, the CPU 21 concludes that a battery of the vehicle is detached in a proper manner. Then, the CPU 21 cuts off a power source of the vehicle remote starting apparatus without resetting the registration flag. On the other hand, when the hood is not opened, the CPU 21 concludes that the power source of the remote starting apparatus is powered down in an improper manner. Then, the CPU 21 powers down the power source of the remote starting apparatus after the registration flag stored in the RAM 23 is reset (step 202).

Thus, when the power source of the remote starting apparatus is powered down in a state in which the hood is opened, the CPU 21 concludes that the battery of the vehicle is detached in the proper manner, and registration is not released. Therefore, there is not need to again do registration process.

Even if the registration flag is set to enable the remote starting function to be activated in the case where switches and sensors are in the normal state (without failure) at a time of powering on, failure of the switches and sensors may occur thereafter. Therefore, the control device 2 always executes failure detection for the switches and sensors after power-on. A failure check at the time of a steady state after the registration process will be described below with reference to a flowchart of FIG. 4.

Figure 4:
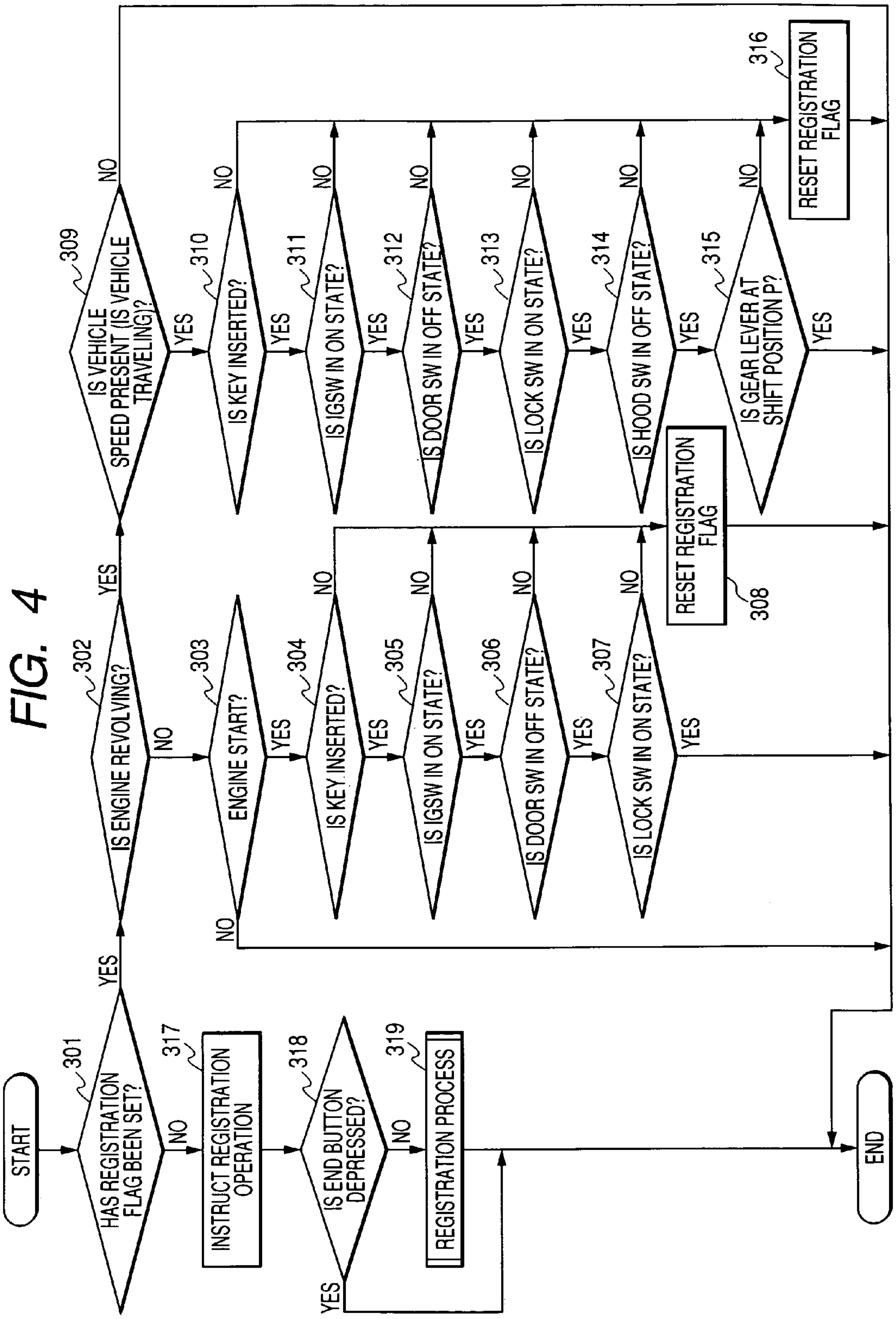
FIG. 4 is a flowchart showing action of a failure check made at the time of a steady state.
Figure 5:
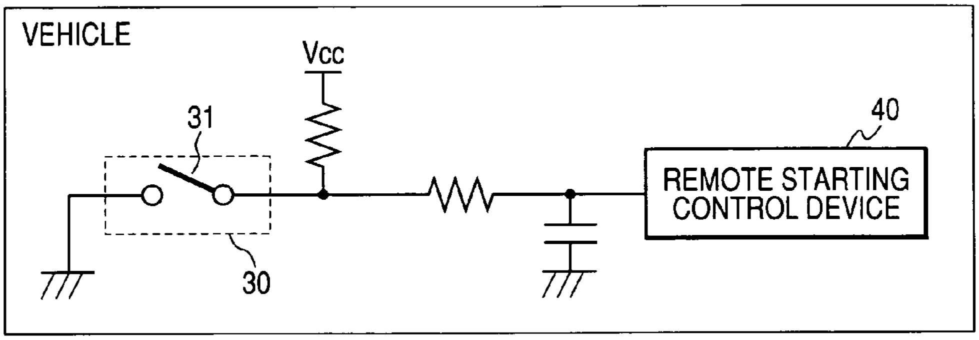
FIG. 5 is a diagram showing a configuration of a hood switch installed inside an engine room.
Figure 6:
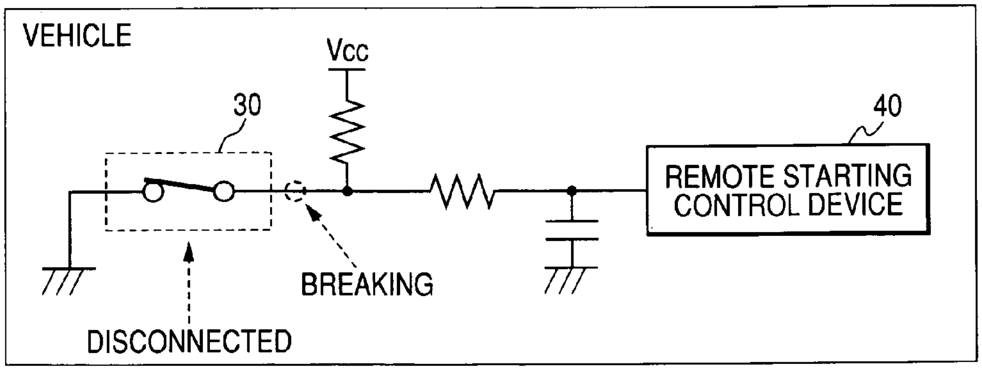
FIG. 6 is a diagram showing a state of break in wiring of the hood switch or failing to connect the hood switch.
Figure 7A:
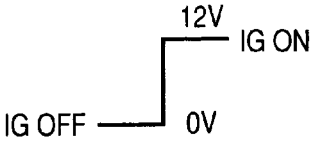
FIGS. 7A to 7J are diagrams showing levels of respective input signals into a control device 2 according to one embodiment of the invention.
Figure 7B:
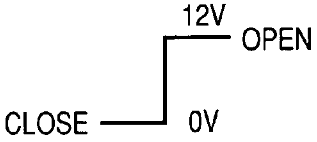
Figure 7C:
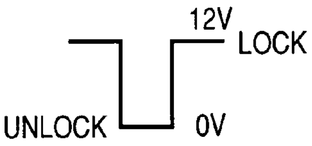
Figure 7D:
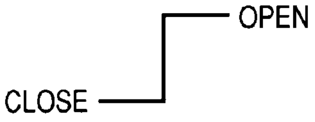
Figure 7E:
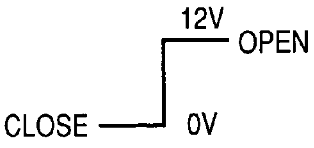
Figure 7F:
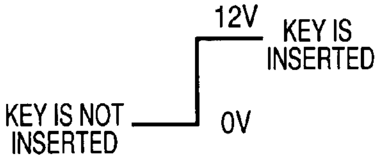
Figure 7G:
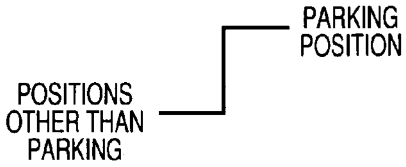
Figure 7H:
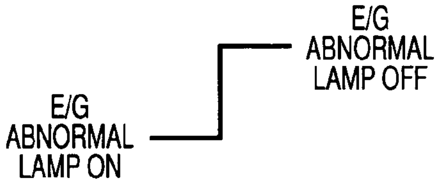
Figure 7I:
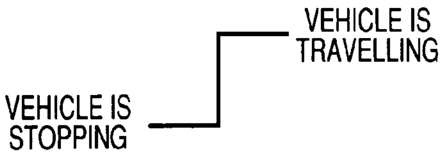
Figure 7J:
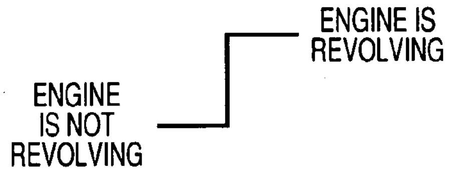

The CPU 21 of the control device 2 reads a failure check program shown in the flowchart of FIG. 4 from the ROM 22 and performs the failure check process every predetermined time. When the failure check program is initiated, the CPU 21 first determines as to whether or not the registration flag stored in the RAM 23 has been set (step 301). When the registration flag has been set, the CPU 21 determines as to whether or not the engine is revolving by determining as to whether or not the engine revolution signal 12 is at the H level (step 302). When the engine is not revolving, the CPU 21 determines as to whether or not an engine start by a key is made (step 303). When the engine start by the key is not made, the failure detection program is terminated.

On the other hand, in the case of concluding that the engine start by the key is made in step 303, the CPU 21 determines as to whether or not a key is present (inserted) by determining as to whether or not an input from the key sensor 8 is at the L level (step 304). When the key is present (inserted), the CPU 21 concludes that the key sensor 8 is normal. Then, the CPU 21 determines as to whether or not the ignition switch is in an on state by determining as to whether or not an input from the IGSW 3 is at the H level (step 305). When the ignition switch is in the on state, the CPU 21 concludes that the IGSW 3 is normal. Then, the CPU 21 determines as to whether or not all the doors are closed by determining as to whether or not an input from the door courtesy switch 4 is at the H level (step 306). In the case of concluding that all the doors are closed, the CPU 21 concludes that the door courtesy switch 4 is normal.

Next, the CPU 21 determines as to whether or not the door is locked by determining as to whether or not an input from the lock switch 5 is at the H level (step 307). In the case of concluding that the door is locked, the CPU 21 concludes that the lock switch 5 is normal. Then, the failure detection program is terminated.

On the other hand, when abnormality of any of the switches is detected in any of step 304, step 305, step 306 and step 307, the CPU 21 terminates the failure detection program after the registration flag stored in the RAM 23 is reset (step 308).

Also, in the case of concluding that the engine is revolving in step 302, the CPU 21 determines as to whether or not the vehicle is traveling by determining as to whether or not the vehicle speed presence signal 11 is at the H level (step 309). When the vehicle is not traveling (that is, the vehicle stops), the failure detection program is terminated.

On the other hand, in the case of concluding that the vehicle is traveling in step 309, the CPU 21 determines as to whether or not the key is present (inserted) by determining as to whether or not the input from the key sensor 8 is at the L level (step 310). When the key is present (inserted), the CPU 21 concluded that the key sensor 8 is normal. Then, the CPU 21 determines as to whether or not the ignition switch is in the on state by determining as to whether or not the input from the IGSW 3 is at the H level (step 311). When the ignition switch is in the on state, the CPU 21 concludes that the IGSW 3 is normal.

Then, the CPU 21 determines as to whether or not all the doors are closed by determining as to whether or not the input from the door courtesy switch 4 is at the H level (step 312). In the case of concluding that all the doors are closed, the CPU 21 concludes that the door courtesy switch 4 is normal. Then, the CPU 21 determines as to whether or not the door is locked by determining as to whether or not the input from the lock switch 5 is at the H level (step 313). In the case of concluding that the door is locked, the CPU 21 concludes that the lock switch 5 is normal. Then, the CPU 21 determines as to whether or not the hood is closed by determining as to whether or not the input from the hood switch 6 is at the H level (step 314). In the case of concluding that the hood is closed, the CPU 21 concludes that the hood switch 6 is normal. Then, the CPU 21 determines as to whether or not the gear shift is in the shift position P by determining as to whether or not the input from the gear shift position sensor 9 is at the L level (step 315). When the gear shift is not in the shift position P, the CPU 21 concludes that the gear shift position sensor 9 is normal, and the failure detection program is terminated.

Also, when abnormality of any of the switches or the sensors is detected in any of step 310, step 311, step 312, step 313, step 314 and step 315, the CPU 21 terminates the failure detection program after the registration flag stored in the RAM 23 is reset (step 316).

On the other hand, in the case of concluding that the registration flag is reset in step 301, the CPU 21 reads from the RAM 23 a message that "Stop a remote starting function because there may be failure in the switches or sensors. Open a door when you perform the registration process of the remote starting apparatus again. Press the end button when you do not perform the registration process.", and displays the message on the display/operation section 26 (step 317). When the operator will perform the registration process, in the case of running, the operator stops the vehicle and performs an operation for opening the driver seat door. When the operator will not perform the registration process, the operator depresses the "end" button on the display/operation section 26.

Then, the CPU 21 determines as to whether or not the "end" button is depressed (step 318). When the "end" button is depressed, the failure detection program is terminated. When the "end" button is not depressed, the failure detection program is terminated after the registration process of steps 104 to 128 shown in the flowchart of FIG. 2 are executed (step 319). Incidentally, the registration process in step 319 is the same as those described above with reference to FIGS. 2A and 2B. Therefore, detailed description thereon is omitted.

As described above, the CPU 21 always determines as to whether or not there is something wrong with the switch or sensor after the remote starting apparatus is mounted on the vehicle. When there is something wrong, the remote starting function is inhibited. Therefore, safety can be ensured.

In the embodiment described above, the inputs from the door switch, the hood switch, the key sensor, the ignition switch, the brake switch and the gear shift position sensor are checked as to whether or not such inputs satisfy the engine starting condition. However, the invention is not limited thereto. Inputs from other switches and sensors may be used. In such a case, changing of signals from the other switches and sensors are checked as to whether the signals satisfy the engine starting condition.

What is claimed is:

1. A vehicle remote starting apparatus for use with a vehicle having an engine, comprising:

an external device that generates an engine starting signal; and a control device that starts the engine when the control device has set a registration flag and the control device receives the engine starting signal from the external device, the external device being seperate from the control device, wherein:

when the control device is mounted on the vehicle, the control device executes an initial registration process for setting the registration flag, which allows the control device to start the engine when the control device receives the engine starting signal.

2. The vehicle remote starting apparatus according to claim 1, wherein:

the control device receives a signal input from the vehicle;

when the control device receives the engine starting signal, after the control device is mounted on the vehicle, and confirms that the signal input from the vehicle satisfies an engine starting condition, the control device starts the engine;

during the initial registration process the control device checks for changes in the signal input from the vehicle; and when the control device determines that the signal input from the vehicle does not change during the registration process, the control device does not set the registration flag.

3. The vehicle remote starting apparatus according to claim 2, wherein during the registration process, the control device requests a user to operate the vehicle in a predetermined way, and then checks as to whether or not the signal input from the vehicle changes in response to user's operation.

4. The vehicle remote starting apparatus according to claim 2, wherein the signal input from the vehicle changes in response to a state of a switch, which is turned off when the switch is in a normal state and is turned on when the switch is operated.

5. The vehicle remote starting apparatus according to claim 2, wherein the signal input from the vehicle is a signal output from a group consisting of a door switch, a hood switch, a key sensor, an ignition switch, a brake switch, a shift position, and a gear shift position sensor.

6. The vehicle remote starting apparatus according to claim 2, further comprising:

a display device disposed on the control device, wherein:

when the control device has not set the registration flag, the control device displays on the display device a message indicating that the control device is in an inhibition state.

7. The vehicle remote starting apparatus according to claim 1, wherein when the control device of the vehicle remote starting apparatus is powered down, the control device releases the registration flag which has been set in the initial registration process.

8. The vehicle remote starting apparatus according to claim 7, wherein when the control device of the vehicle remote starting apparatus is powered down in a state where a hood of the vehicle is opened, the control device does not release the registration flag which has been set in the initial registration process.

9. The vehicle remote starting apparatus according to claim 1, wherein when the control device of the vehicle remote starting apparatus is powered on, the control device releases the registration flag which has been set in the initial registration process except for in a state where a hood of the vehicle is opened.

10. The vehicle remote starting apparatus according to claim 1, wherein when the engine is started using a key, the control device checks the signal input from the vehicle and then if the signal input from the vehicle does not satisfy a predetermined condition, the control device releases the registration flag which has been set in the initial registration process.

11. The vehicle remote starting apparatus according to claim 1, wherein:

the signal input from the vehicle includes a specific signal, which should be in a predetermined state during traveling of the vehicle; and during the traveling of the vehicle, the control device checks the specific signal and then if the specific signal is not in the predetermined state, the control device releases the registration flag which has been set in the initial registration process.

12. The vehicle remote starting apparatus according to claim 1, wherein the external device is a portable remote controller that is capable of transmitting the engine starting signal to the vehicle remote starting apparatus.

13. A vehicle remote starting system comprising:

a signal transmission unit that transmits an engine starting signal; and a control device that starts an engine when the control device has set a registration flag and the control device receives the engine starting signal from the signal transmission unit, the control device being separate from the signal transmission unit wherein:

when the control device is mounted on a vehicle, the control device executes an initial registration process for setting the registration flag, which allows the control device to start the engine when the control device receives the engine starting signal.

14. A method for executing a registration process for initially setting a registration flag, which allows a control device to start an engine when the control device receives an engine starting signal from an external device, the method comprising:

checking changing of a signal input from a vehicle; and when the signal input from the vehicle changes, setting the registration flag.

15. The method according to claim 14, wherein the checking comprises requesting a user to operate the vehicle in a predetermined way, and then checking as to whether or not the signal input from the vehicle changes in response to user's operation.

16. A control device which is configured to start an engine of a vehicle when a registration flag is set and an engine starting signal is received from an external device which is separated from the control device, wherein when the control device is mounted on the vehicle, the control device executes an initial registration process for setting the registration flag, which allows the control device to start the engine when the engine starting signal is received.

* * * * *